United States Patent
Ballester et al.

(10) Patent No.: US 11,951,838 B2
(45) Date of Patent: Apr. 9, 2024

(54) ENERGY STORAGE ARRANGEMENT

(71) Applicant: DEERE & COMPANY, Moline, IL (US)

(72) Inventors: Hector Ballester, Madrid (ES); Elias Zarzuela, Madrid (ES)

(73) Assignee: DEERE & COMPANY, Moline, IL (US)

( * ) Notice: Subject to any disclaimer, the term of this patent is extended or adjusted under 35 U.S.C. 154(b) by 847 days.

(21) Appl. No.: 17/071,054

(22) Filed: Oct. 15, 2020

(65) Prior Publication Data
US 2021/0123486 A1    Apr. 29, 2021

(30) Foreign Application Priority Data
Oct. 23, 2019   (DE) .................. 202019004369.1

(51) Int. Cl.
| | | |
|---|---|---|
| B60K 6/10 | (2006.01) | |
| A01B 71/06 | (2006.01) | |
| A01D 69/00 | (2006.01) | |
| A01F 15/08 | (2006.01) | |

(52) U.S. Cl.
CPC ............... B60K 6/10 (2013.01); A01B 71/06 (2013.01); A01D 69/00 (2013.01); B60K 6/105 (2013.01); *A01D 69/002* (2013.01); *A01F 15/0841* (2013.01)

(58) Field of Classification Search
CPC .......... B60K 6/10; B60K 6/105; A01D 69/00
See application file for complete search history.

(56) References Cited

U.S. PATENT DOCUMENTS 7,473,204 B2 * 1/2009 Costello ................. B60K 6/10
                                                    475/263

FOREIGN PATENT DOCUMENTS

| CN | 101722940 A | * | 6/2010 | ............... B60T 1/10 |
| CN | 203427955 U | | 2/2014 | |
| FR | 2958225 A1 | * | 10/2011 | ............... B60K 1/04 |
| GB | 2519116 A | | 4/2015 | |

OTHER PUBLICATIONS

European Search Report issued in counterpart application No. 20200174.9 dated Apr. 14, 2021 (05 pages).

* cited by examiner

*Primary Examiner* — Thomas C Diaz

(57) ABSTRACT

An energy storage arrangement includes a shaft for transmitting torque, a housing, an actuator configured to be axially moved, a freewheel disposed between the shaft and actuator and fastened to the shaft, the freewheel being configured to transmit no torque in one rotational direction, an energy store configured to store torque, a support element, an outer coupling between the housing and the support element, and an inner coupling between the support element and the shaft.

8 Claims, 3 Drawing Sheets

ENERGY STORAGE ARRANGEMENT

RELATED APPLICATION

This application claims priority under 35 U.S.C. § 119 to German patent application DE 202019004369.1, filed Oct. 23, 2019, the disclosure of which is incorporated herein by reference in its entirety.

BACKGROUND

The present disclosure relates to an energy storage arrangement for storing, holding and retrieving torque.

Agricultural machines, such as balers, hay turners and harvesting machines, have driven shafts which control the mechanism. In the case of a baler, the compressor piston, which compresses the picked-up mown crops, is driven by a connecting rod which in turn is operated by the power take-off shaft via an intermediate gear. The load cycles on such machines are not uniform and the load level may also fluctuate considerably with each operating cycle. The drive power which is demanded with these changing conditions generates a high load on the entire drive train and also affects the driving comfort of the traction machine or the tractor.

SUMMARY

Various aspects of examples of the present disclosure are set out in the claims.

In accordance with an embodiment of the present disclosure, an energy storage arrangement includes a shaft for transmitting torque, a housing, an actuator configured to be axially moved, a freewheel disposed between the shaft and actuator and fastened to the shaft, the freewheel being configured to transmit no torque in one rotational direction, an energy store configured to store torque, a support element, wherein the energy store is fastened, on a first energy store side, to the support element and, on a second energy store side, to the actuator, an outer coupling between the housing and the support element, and an inner coupling between the support element and the shaft. By axial displacement, the actuator is configured to come into contact, on a first actuator side, with the housing and, on a second actuator side, with the support element so that, via the actuator, either the shaft is connected to the housing or the shaft is connected to the support element. A relative rotation occurs between the actuator and the support element so that, by shifting the inner coupling and the outer coupling and the actuator, torque is charged, discharged or held.

For charging the energy store, the inner coupling may be closed, the support element may rotate together with the shaft, and the actuator may be blocked against the housing. For holding the torque in the energy store, the inner coupling may be closed, the support element may rotate together with the shaft, and the actuator may be blocked against the support element. For discharging the energy store, the outer coupling may be closed, the support element may be held together with the housing, and the actuator may be in a central position in which no blocking takes place. The freewheel may be configured as a roller-type freewheel. The freewheel may be configured as a detent. The energy store may be a spring store, a piston store, and/or a flywheel store. The actuator may be configured to be axially displaced by a relative rotation to the shaft.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
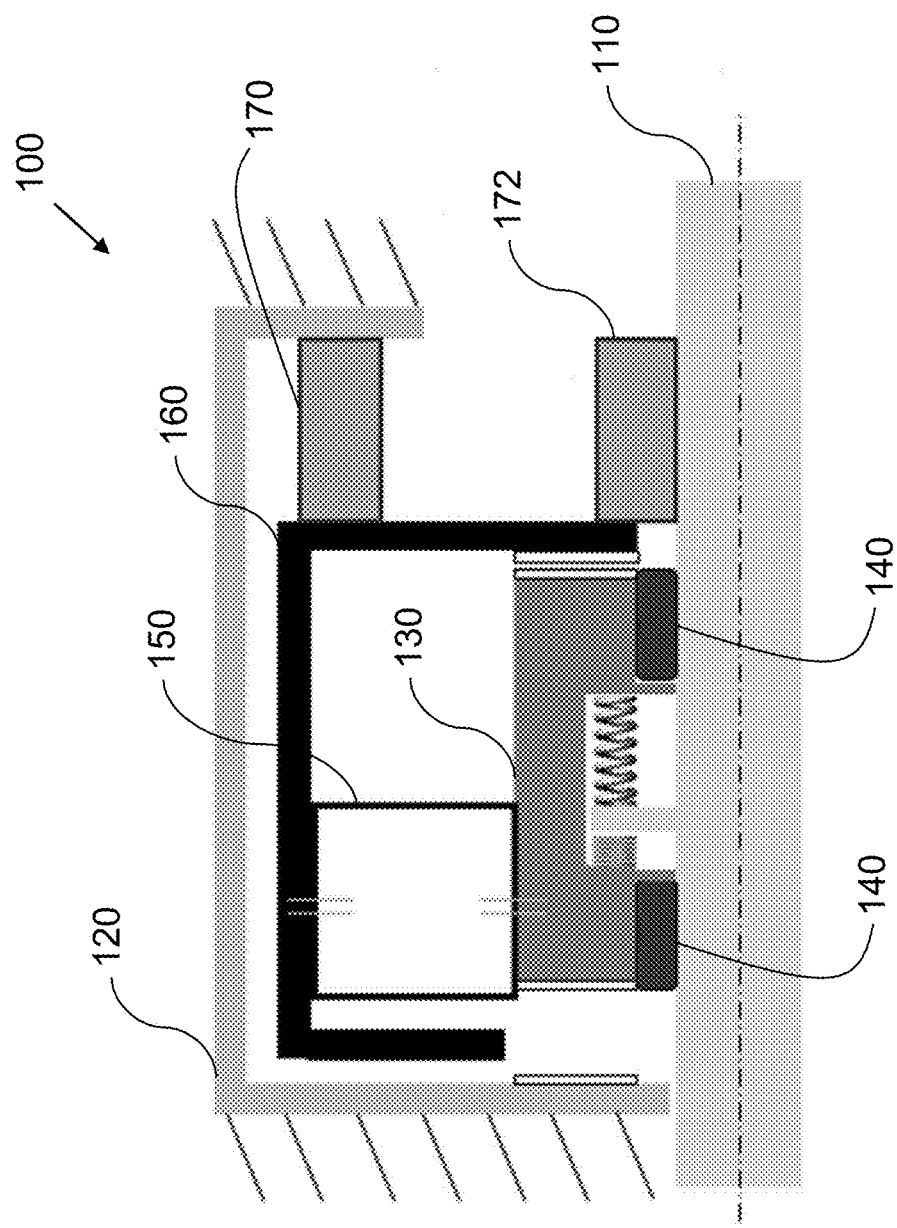
FIG. 1 illustrates an energy storage arrangement in a holding state in which neither charging nor discharging is carried out in accordance with an embodiment of the present disclosure.
Figure 2:
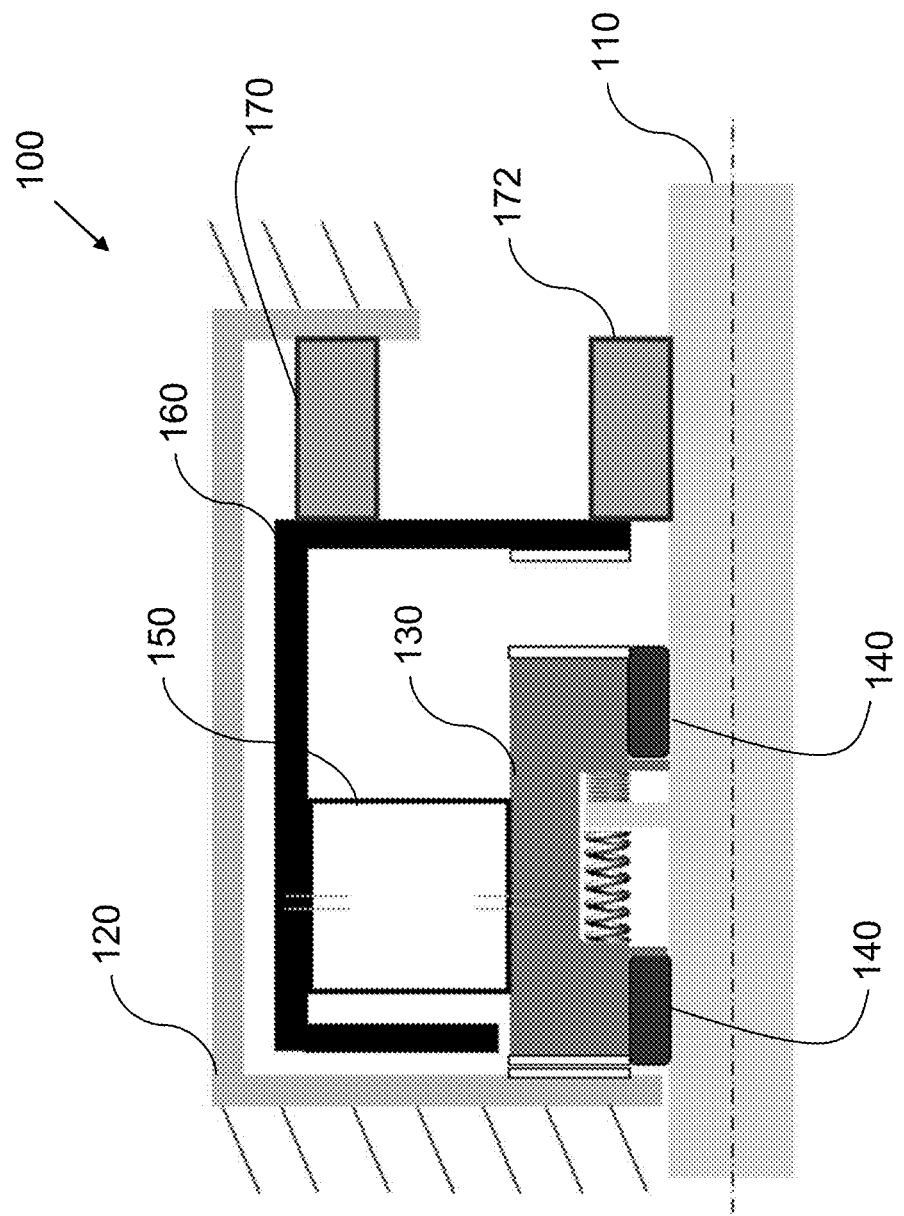
FIG. 2 illustrates a charging state in which torque is introduced into an energy store in accordance with an embodiment of the present disclosure.
Figure 3:
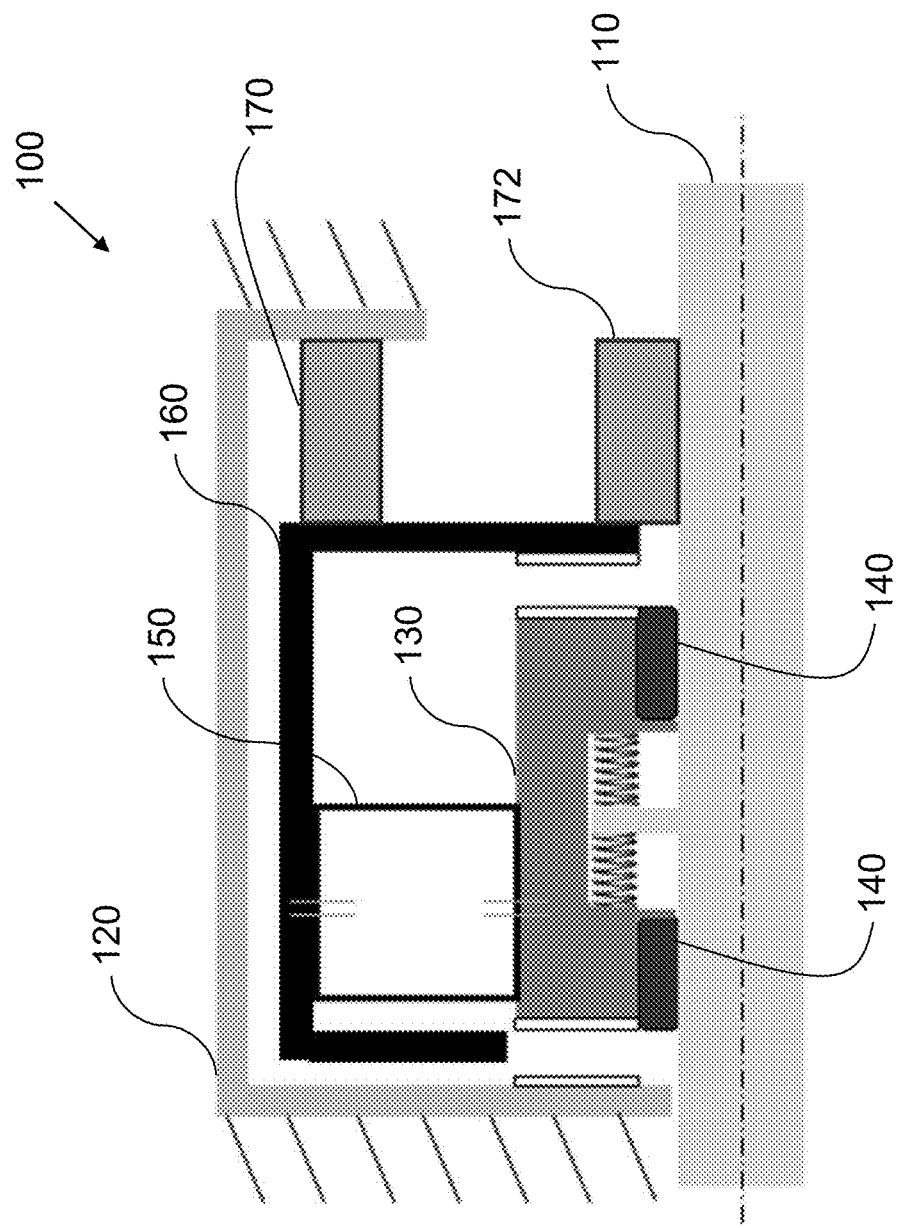
FIG. 3 illustrates a discharging state in which torque is removed from the energy store in accordance with an embodiment of the present disclosure.

At least one embodiment of the subject matter of this disclosure is understood by referring to FIGS. 1 through 3 of the drawings.

The energy storage arrangement 100 consists of a shaft 110 which is used for introducing and retrieving torque. The shaft 110 may be used as a drive for a pick-up device for mown crops, for a piston of a baler or for similar tasks. The shaft 110 is rotatably held inside a housing 120, generally via bearings which are not shown here.

A freewheel 140 is attached to the shaft 110, said freewheel being able to consist of a plurality of segments. The freewheel 140 is without resistance in one rotational direction so that torque is not transmitted in this rotational direction. In the other rotational direction the freewheel 140 activates a lock so that the introduced torque is transmitted from and to the shaft 110.

An actuator 130, which is connected via the freewheel 140 to the shaft 110, is provided on the freewheel 140. Torque from the actuator 130 is transmitted in one rotational direction to the shaft 110. The actuator 130 is adjustable in the axial direction of the shaft 110 and has in each case at the axial ends thereof a contact surface so that by the axial displacement of the actuator 130 either a contact surface comes into engagement or the actuator 130 is held in a central position in which none of the contact surfaces is in engagement.

An input of the energy store 150 is fastened fixedly in terms of rotation to the actuator 130. The energy store 150 is able to receive, hold and deliver torque.

On an outer face of the energy store 150 this energy store is fastened to the support element 160. The support element 160 encloses the energy store 150 such that the actuator 130 is able to bear against the support element 160 in one position and produces a connection which is fixed in terms of rotation. The support element 160 also has a contact surface in order to improve the friction in contact with the actuator 130.

In each case a shiftable coupling 170, 172 is provided between the support element 160 and the shaft 110, on the one hand, and the housing 120, on the other hand. By means of the couplings 170, 172, a rotationally fixed connection is shifted between the shaft 110 and the support element 160 or between the support element 160 and the housing 120. By the interaction between the couplings 170, 172 and the positions of the actuator 130, the energy store 150 may be toggled between the holding, charging and discharging states.

In FIG. 1, the holding state of the energy storage arrangement 100 is shown. The actuator 130 is shifted such that it produces a connection which is fixed in terms of rotation between the support element 160 and the energy store 150. The energy store 150, which is already connected on an input side fixedly in terms of rotation to the support element 160, is thus in a blocked state since both inputs are held fixedly in terms of rotation against the support element 160.

At the same time, the inner coupling 172 is closed and the outer coupling 170 is open so that the shaft 110 is connected fixedly in terms of rotation to the support element 160. A rotation of the shaft 110 leads to a rotation of the support element 160 and the actuator 130, so that torque within the energy store 150 may not be removed. The energy store 150 rotates together with the shaft 110 about the common axis.

In FIG. 2, the charging state of the energy storage arrangement 100 is shown. The charging state serves to store torque in the energy store 150 in order to retrieve it at a later time. The actuator 130 is shifted such that it connects the housing 120 fixedly in terms of rotation to a contact surface. At the same time, the inner coupling 172 is closed so that the support element 160 rotates together with the shaft 110 and thus couples the shaft 110 to an input of the energy store 150. The freewheel 140 ensures that a rotation of the shaft 110 does not lead to a rotation of the actuator 130, this actuator being coupled against the fixed housing 120. The outer coupling 170 is open so that the support element 160 is freely rotatable relative to the housing 120. A rotation of the shaft 110 leads via the inner coupling 172 to a rotation of the support element 160 which in turn leads to the introduction of torque into the energy store 150. This energy store is held with an input fixedly in terms of rotation on the housing 120 via the actuator 130, so that the rotation of the support element 160 leads to a charging of the energy store 150.

In FIG. 3, the discharging state is shown. The actuator 130 is located in a central position in which neither the support element 160 nor the housing 120 are in contact. The outer coupling 170 is closed and connects the housing 120 fixedly in terms of rotation to the support element 160 whilst the inner coupling 172 is open. The energy store 150 is connected to the housing 120 fixedly in terms of rotation via the support element 160 at one input, and is connected to the shaft 110 fixedly in terms of rotation via the actuator 130 and the freewheel 140 at the other input. Torque which is contained in the energy store 150 is supported on the housing 120 on one side so that torque is delivered from the energy store 150 to the shaft 110.

The energy store 150 is also able to receive the torque in the form of a piston store or a flywheel store. The operating method via the couplings 170, 172 may be carried out with modifications.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. An energy storage arrangement comprising:
   a shaft for transmitting torque;
   a housing;
   an actuator configured to be axially moved;
   a freewheel disposed between the shaft and actuator and fastened to the shaft, the freewheel being configured to transmit no torque in one rotational direction;
   an energy store configured to store torque;
   a support element, wherein the energy store is fastened, on a first energy store side, to the support element and, on a second energy store side, to the actuator;
   an outer coupling between the housing and the support element; and
   an inner coupling between the support element and the shaft;
   wherein, by axial displacement, the actuator is configured to come into contact, on a first actuator side, with the housing and, on a second actuator side, with the support element so that, via the actuator, either the shaft is connected to the housing or the shaft is connected to the support element; and
   wherein a relative rotation occurs between the actuator and the support element so that, by shifting the inner coupling and the outer coupling and the actuator, torque is charged, discharged or held.

2. The energy storage arrangement of claim 1, wherein, for charging the energy store, the inner coupling is closed, the support element rotates together with the shaft, and the actuator is blocked against the housing.

3. The energy storage arrangement of claim 1, wherein, for holding the torque in the energy store, the inner coupling is closed, the support element rotates together with the shaft, and the actuator is blocked against the support element.

4. The energy storage arrangement of claim 1, wherein, for discharging the energy store, the outer coupling is closed, the support element is held together with the housing, and the actuator is in a central position in which no blocking takes place.

5. The energy storage arrangement of claim 1, wherein the freewheel is configured as a roller-type freewheel.

6. The energy storage arrangement of claim 1, wherein the freewheel is configured as a detent.

7. The energy storage arrangement of claim 1, wherein the energy store is at least one of a spring store, a piston store, and a flywheel store.

8. The energy storage arrangement of claim 1, wherein the actuator is configured to be axially displaced by a relative rotation to the shaft.

\* \* \* \* \*